(12) United States Patent
Ranalli

(10) Patent No.: US 7,321,825 B2
(45) Date of Patent: Jan. 22, 2008

(54) METHOD AND APPARATUS FOR DETERMINING VEHICLE OPERATING CONDITIONS AND PROVIDING A WARNING OR INTERVENTION IN RESPONSE TO THE CONDITIONS

(75) Inventor: Ronald J. Ranalli, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 613 days.

(21) Appl. No.: 10/605,768

(22) Filed: Oct. 24, 2003

(65) Prior Publication Data

US 2005/0090938 A1    Apr. 28, 2005

(51) Int. Cl.
G01C 21/00       (2006.01)

(52) U.S. Cl. .............. 701/205; 701/209; 701/210; 340/995.21; 340/995.23

(58) Field of Classification Search .............. 701/1, 701/205, 209–210; 340/995.21, 995.23
See application file for complete search history.

(56) References Cited

U.S. PATENT DOCUMENTS

| | | | |
|---|---|---|---|
| 4,599,620 A | | 7/1986 | Evans |
| 5,050,080 A | * | 9/1991 | Abe .......................... 701/35 |
| 5,101,356 A | | 3/1992 | Timothy et al. |
| 5,266,958 A | * | 11/1993 | Durboraw, III ........ 342/357.08 |
| 5,737,215 A | * | 4/1998 | Schricker et al. ............ 700/29 |
| 5,757,202 A | * | 5/1998 | Sato ............................ 324/765 |
| 5,848,365 A | * | 12/1998 | Coverdill ...................... 701/35 |
| 5,884,323 A | * | 3/1999 | Hawkins et al. ............. 707/201 |
| 5,900,875 A | * | 5/1999 | Haitani et al. ............... 715/840 |
| 6,006,274 A | * | 12/1999 | Hawkins et al. ............. 709/248 |
| 6,097,997 A | * | 8/2000 | Belbruno ...................... 701/13 |
| 6,253,124 B1 | * | 6/2001 | Belbruno ...................... 701/13 |
| 6,278,946 B1 | * | 8/2001 | Belbruno ..................... 701/226 |
| 6,315,074 B1 | | 11/2001 | Achhammer et al. |

(Continued)

FOREIGN PATENT DOCUMENTS

EP         1260831 B1 *   8/2006

(Continued)

OTHER PUBLICATIONS

Loop gain of a spacecraft switched shunt power system, Keng Wu; Aerospace and Electronic Systems, IEEE Transactions on vol. 30, Issue 4, Oct. 1994 pp. 1049-1053, Digital Object Identifier 10.1109/7.328763.*

(Continued)

*Primary Examiner*—Cuong Nguyen
(74) *Attorney, Agent, or Firm*—Frank MacKenzie; Dickinson Wright PLLC

(57) ABSTRACT

A control system (12) for an automotive vehicle (10) includes a GPS system (16) that generates a vehicle position for a vehicle relative to a surface, a plurality of driver inputs (40), and a plurality of vehicle inputs (50). A controller (14) is coupled to the GPS system (16), the driver inputs (40) and the vehicle inputs (50). The controller determines a predicted path in response to the plurality of driver inputs and the vehicle inputs and a desired path in response to the GPS system (16). The controller performs a comparison of the predicted path and the desired path and generates a control signal in response to the comparison.

16 Claims, 1 Drawing Sheet

U.S. PATENT DOCUMENTS

| | | | |
|---|---|---|---|
| 6,317,686 B1* | 11/2001 | Ran | 701/210 |
| 6,338,012 B2 | 1/2002 | Brown et al. | |
| 6,341,250 B1* | 1/2002 | Belbruno | 701/13 |
| 6,370,475 B1 | 4/2002 | Breed et al. | |
| 6,370,938 B1 | 4/2002 | Leimbach et al. | |
| 6,377,211 B1 | 4/2002 | Hsiung | |
| 6,434,462 B1 | 8/2002 | Bevly et al. | |
| 6,434,512 B1* | 8/2002 | Discenzo | 702/184 |
| 6,442,482 B1* | 8/2002 | Belbruno | 701/226 |
| 6,496,758 B2 | 12/2002 | Rhode et al. | |
| 6,529,803 B2 | 3/2003 | Meyers et al. | |
| 6,577,930 B2* | 6/2003 | Belbruno | 701/13 |
| 6,715,531 B2* | 4/2004 | Simon | 160/271 |
| 6,745,623 B2* | 6/2004 | Schmitt | 73/146 |
| 6,904,359 B2* | 6/2005 | Jones | 701/204 |
| 6,996,469 B2* | 2/2006 | Lau et al. | 701/210 |
| 6,999,860 B2* | 2/2006 | Belbruno | 701/13 |
| 2002/0056582 A1 | 5/2002 | Chubb et al. | |
| 2002/0082749 A1 | 6/2002 | Meyers et al. | |
| 2002/0085244 A1 | 7/2002 | Blasio et al. | |
| 2002/0139599 A1 | 10/2002 | Lu et al. | |
| 2003/0065430 A1 | 4/2003 | Lu et al. | |
| 2003/0195697 A1* | 10/2003 | Jones | 701/201 |
| 2004/0049335 A1* | 3/2004 | Schmidt et al. | 701/201 |
| 2004/0064248 A1* | 4/2004 | Holze et al. | 701/207 |
| 2005/0090938 A1* | 4/2005 | Ranelli | 701/1 |
| 2005/0090940 A1* | 4/2005 | Pajakowski et al. | 701/1 |
| 2006/0142902 A1* | 6/2006 | Hohl et al. | 701/1 |

FOREIGN PATENT DOCUMENTS

| | | | |
|---|---|---|---|
| JP | A-H11-254993 | | 9/1999 |
| JP | 2002002240 A | * | 1/2002 |
| KR | 10-2003-74731 | * | 10/2003 |
| WO | PCT/DE01/01505 | * | 4/2001 |

OTHER PUBLICATIONS

Ensuring GPS navigation integrity using receiver autonomous integrity monitoring, Michalson, W.R.; Aerospace and Electronic Systems Magazine, IEEE, vol. 10, Issue 10, Oct. 1995 pp. 31-34, Digital Object Identifier 10.1109/62.469796.*

Passive landing aids for precision EVS approach and landing, Korn, B.; Doehler, H.-U.; Digital Avionics Systems Conference, 2003. DASC '03. The 22$^{nd}$, vol. 2, Oct. 12-16, 2003 pp. 9.D.1-9.1-8 vol. 2, Digital Object Identifier, .1109/DASC.2003.1245916.*

Sep. 13, 2005, DERWENT-ACC-No. 2005-383145, Processing element for use in navigation system, which initiates fault detection and isolation procedure to eliminate one or more faulty ranging signals from use in navigation calculation INVENTOR: Pasturel, P K.*

* cited by examiner

METHOD AND APPARATUS FOR DETERMINING VEHICLE OPERATING CONDITIONS AND PROVIDING A WARNING OR INTERVENTION IN RESPONSE TO THE CONDITIONS

BACKGROUND OF INVENTION

The present invention relates generally to hazard avoidance for automotive vehicles, and more particularly, the present invention provides a control system for determining a desired path and an intended path in relation to the vehicle conditions to advise or guide the vehicle operator.

Trucks and sport utility vehicles have a high center of gravity. Therefore, trucks and SUVs have a greater risk for rollover conditions partly due to usage and driver errors.

Systems are known by which the vehicle conditions are monitored through various sensors to prevent the vehicle from yawing or rolling over. Such systems are referred to in the industry as yaw stability control systems and rollover stability control systems. Such systems wait until the vehicle reaches some limit and intervention in spite of the driver's operation is provided to the vehicle to prevent yawing out or rolling over.

In some situations, it may be desirable to provide the vehicle operator with an indication of a potential instability of the vehicle prior to losing control. This will provide the vehicle operator an opportunity to correct the situation based on the conditions.

SUMMARY OF INVENTION

The present invention provides a system to generate a warning for the system based on a global positioning system, driver inputs, and vehicle inputs. The system provides a warning to the vehicle operator prior to the vehicle becoming uncontrollable. In the event that unstable conditions persist, intervention may be performed by the present system.

In one aspect of the invention, a control system for a vehicle includes a GPS system that generates a vehicle position signal for a vehicle relative to a surface, a plurality of driver inputs, a plurality of vehicle inputs, and a controller. The controller is coupled to the GPS system, the plurality of driver inputs, and the plurality of vehicle inputs. The controller determines a predicted path in response to the plurality of driver inputs and the vehicle inputs and a desired path in response to the GPS system.

The controller performs a comparison of the predicted path and the desired path. The controller generates a control signal in response to the comparison.

In a further aspect of the invention, a method of controlling an automotive vehicle includes generating a vehicle position signal for a vehicle relative to a surface, generating a plurality of driver inputs, generating a plurality of vehicle inputs, determining a predicted path in response to the plurality of driver inputs and vehicle inputs and the desired path in response to the GPS system, performing a comparison of the predicted path and the desired path, and generating a control signal in response to the comparison.

One advantage of the invention is that a warning can be provided to the vehicle operator based on the conditions of the road, the predicted path, the desired path, and may take into consideration the vehicle conditions.

Other advantages and features of the present invention will become apparent when viewed in light of the detailed description of the preferred embodiment when taken in conjunction with the attached drawings and appended claims.

DETAILED DESCRIPTION

The following figures are described with respect to a system for generating a driver warning and providing intervention to avoid a loss of control condition. Those skilled in the art will recognize that one or the other types of systems may be controlled by the control system. Also, although a number of different types of driver inputs and vehicle inputs are illustrated, not all of the inputs are required in a commercial embodiment.

Figure 1:
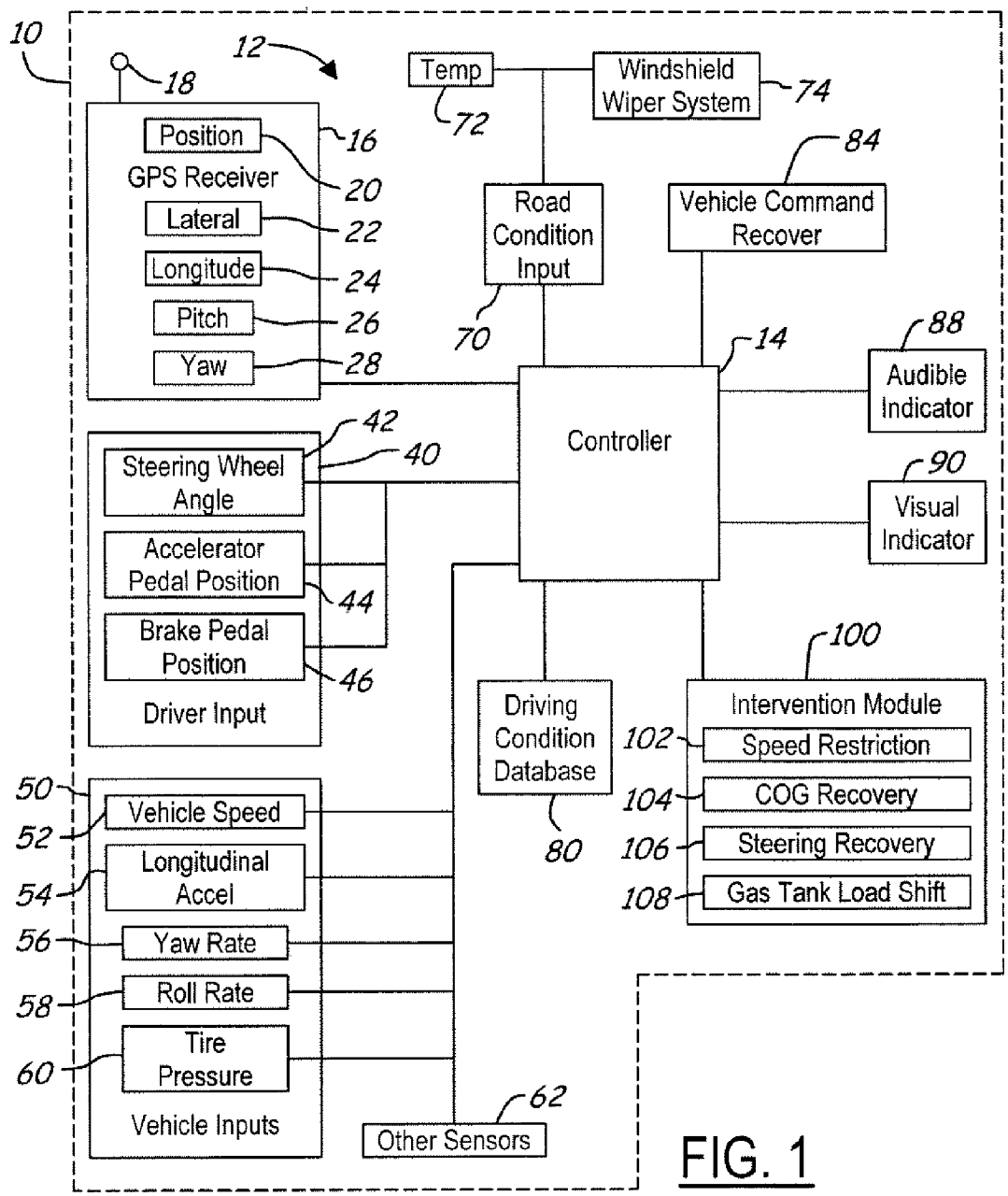
FIG. 1 is a block diagrammatic view of a control system according to the present invention.

Referring now to FIG. 1, an automotive vehicle 10 has a control system 12 used for warning the vehicle operator of a condition and providing an intervention should the conditions persist. The control system 12 includes a controller 14 that is preferably microprocessor-based. The controller 14 has various inputs and outputs as will be described below.

Control system 12 includes a global positioning system (GPS) receiver 16 that has an antenna 18 that receives signals from a satellite or other fixed source such as a cell tower. GPS receiver 16 generates a position signal 20. The GPS receiver 16 may also generate a lateral acceleration signal 22, a longitudinal velocity signal 24, a pitch angle 26, and a yaw angle 28. Each of the signals 20-28 are provided to controller 14. These signals may be measured in different ways including determining the Doppler shift of the GPS receiver signals as is known in the art. The position signal 20 provides the vehicle position relative to a surface on the earth. The lateral velocity signal 22 provides the lateral or sideways velocity of the vehicle. The longitudinal velocity provides a longitudinal indication of the vehicle. The pitch angle 26 and yaw angle 28 may be derived from the lateral velocity and longitudinal velocity. The pitch angle is the elevational angle from front to rear of the vehicle. The yaw angle is the amount the vehicle is rotated relative to the longitudinal direction.

Controller 14 may also be coupled to driver input 40. Driver input 40 may include various controls that are operated by the vehicle operator. The driver input 40 may include a steering wheel angle signal from a steering wheel angle sensor 42. The steering wheel angle sensor 42 provides an indication of the position of the hand wheel of the vehicle. An accelerator pedal position 44 generates an acceleration pedal position signal that is provided to controller 14. The accelerator pedal position 14 may be provided by a throttle position sensor or a direct sensor on the accelerator pedal. The accelerator pedal position 44 provides the controller 14 with the amount of desired operator input on the accelerator pedal. A brake pedal position sensor 46 generates a brake pedal position signal that is provided to the controller 14. Brake pedal position sensor 46 provides an indication of the amount of driver input desired for the brake pedal.

Vehicle input 50 may also be provided to controller 14. Vehicle inputs 50 include vehicle speed sensor 52 generating a speed of the vehicle. Various sensors may be used to provide the vehicle speed including toothed wheel sensors provided by ABS systems. The toothed wheel sensors provide pulses that are averaged at each wheel to determine the vehicle speed. Those skilled in the art will recognize that other types of sensors may provide vehicle speed such as a transmission sensor. Vehicle speed may also be derived from the GPS system 16. A longitudinal acceleration sensor 54 may provide a longitudinal acceleration signal to controller 14. Of course, those skilled in the art will recognize that the longitudinal acceleration may be derived from the change in vehicle speed from vehicle speed sensor 52. A yaw rate sensor 56 provides a yaw rate signal to controller 54. The yaw rate is the amount of rotation about a vertical axis. A roll rate sensor 58 generates a roll rate signal that is provided to controller 14. Roll rate sensor 58 provides an amount of rolling of the vehicle about the longitudinal axis of the vehicle.

A tire pressure sensor 60 may provide an indication as to the pressure of each of the tires of the vehicle to controller 14. Tire pressure sensor 60 may actually comprise individual pressure sensors coupled to each of the wheels or may be a derived sensor generated from the anti-lock braking system in an indirect method as is known to those skilled in the art. Each of the signals from each of the tire pressure sensors, if so equipped, is provided to the controller 14. A sudden loss of tire pressure may provide control issues to be compensated by controller 14.

Other sensors 62 may be included in vehicle inputs 50. Other sensors 52 may include pitch rate sensors, pitch acceleration, the position of the steered wheels at the road, lateral acceleration, and the like. Some of these signals may be somewhat duplicative of the signals provided by the GPS receiver 16. Should such a conflict exist, one or the other may be used depending on reliability considerations.

Controller 14 may also include a road condition input 70. Road condition input 70 may include inferential sensors such as a temperature sensor 72 that provides the temperature of the ambient air from which the temperature of the road surface may be predicted. Road condition input 70 may also be provided from a windshield wiper system 74. Many windshield wiper systems include a rain sensor for detecting rain upon the windshield. Thus, if rain is detected upon the windshield, rain is present upon the road surface. Should the temperature be low enough and the windshield wiper system detects moisture, the moisture may be snow. Thus, road condition input 70 provides a road condition signal to controller 14 indicative of the road conditions. The road conditions may affect the desired or predicted path of the vehicle. A driving condition database 80 may also provide input to controller 14. Driving condition database 80 is illustrated directly coupled to controller 14. Those skilled in the art will recognize that the driving condition database may also be included within GPS system receiver 16. Driving condition database 80 may coordinate the position signal provided by the GPS system to a vehicle map so that the controller may determine a desirable path relative to the map. Also, driving condition database 80 may determine or record driving conditions experienced often by the vehicle. For example, on a vehicle operator's ride to work certain parameters including vehicle speed and direction may be experienced often on various roads. These inputs may be used to generate the desired path as will be further described below.

Controller 14 may also include a voice command receiver 84. Voice command receiver 84 may allow the vehicle operator to activate or deactivate the device based on simple voice commands. Thus, if vehicle intervention is not desired, an end of intervention voice command may be provided by the vehicle operator. Thus, the voice command receiver 84 may provide voice recognition to generate precoded signals to controller 14.

An audible indicator 88 may also be coupled to controller 14. Audible indicator may be a warning buzzer interior to the vehicle or a horn exterior to the vehicle to provide the vehicle operator or other vehicle operators as to an unstable condition within the vehicle.

A visual indicator 90 such as a warning light, a navigation system display, or an instrument panel display may be controlled by a control signal from controller 14 in response to an unstable condition. Visual indicator 90 may also include an exterior visual indicator such as flashing headlamps.

Controller 14 may be coupled to an intervention module 100. Intervention module 100 may be a separate module or be incorporated into various operating systems of the vehicle. Intervention module may, for example, generate a speed restriction signal 102, a suspension center of gravity recovery signal 104, a steering recovery signal 106, and/or a gas tank load shift signal 108. Speed restriction signal 102 may provide a speed limiting signal to the engine control or electronic throttle positioning system to restrict the overall speed of the vehicle. The suspension center of gravity recovery signal 104 may lower or raise the suspension components such as a shock absorber to change the center of gravity to maintain control of the vehicle. Steering recovery signal 106 may include changing the steering position in a hydraulic or electrical steering system. For example, a steering input change may be provided to a steer-by-wire type system.

A gas tank load shift signal 108 may be used to change the position of baffles or bladders within a gas tank to shift the center of gravity to a desired position.

In operation, the present invention is based upon a chaos theory. The modeling provided uses probability, statistics, and an acknowledgement of uncertainty to govern both driver warnings and module intervention during radical motion events. The driver warnings provided from the controller 14 may be issued during risky maneuvers and hazardous driving conditions to prevent the vehicle from reaching unsafe driving conditions. Intervention may be provided when the practical operating limits have been far exceeded and the vehicle is not operating safely within recognized operating parameters. The controller 14 seeks to look ahead using the GPS system receiver 16 to determine a desired path of the vehicle.

Figure 2:
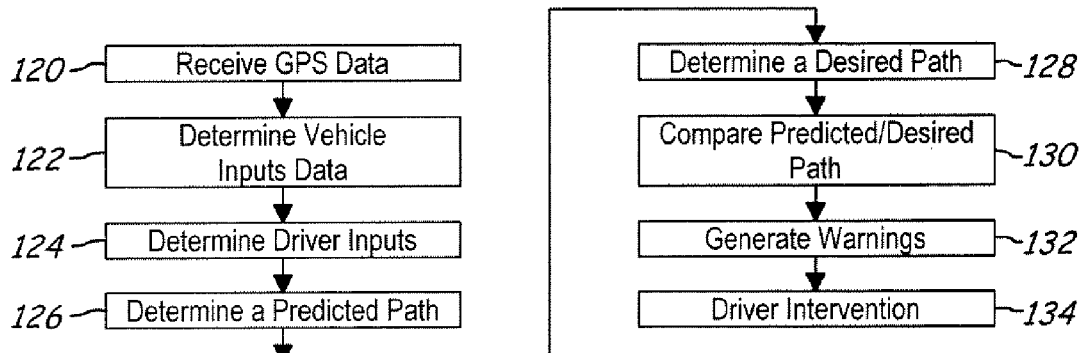
FIG. 2 is a flow chart of one method of operating a control system according to the present invention.

Referring now to FIG. 2, the control system operates by first receiving global position system data in step 120. Global position data may be generated from the position signal 20 of global position system receiver 16 of FIG. 1. In step 122 various vehicle input data is provided from vehicle inputs 50. Vehicle inputs may include various conditions including but not limited to vehicle speed, longitudinal acceleration, lateral acceleration, yaw rate, roll rate and tire pressures. In step 124 the driver inputs from driver input 40 is determined. The driver inputs may include steering wheel angle, acceleration pedal position and brake pedal position as described above in FIG. 1. In step 126 a predicted path is generated based upon the driver inputs 40 and the vehicle inputs 50. The predicted path may also take into consideration road condition input 70. In step 128 a desired path for the vehicle is determined. The desired path may take into consideration the road condition input 70 and the position lateral velocity, longitudinal velocity, the pitch angle and yaw angle signals from the global positioning system receiver 16. In step 130, a comparison is performed between the predicted and desired path. Although a direct comparison may be performed in step 130 of the desired path and predicted path, the chaos theory may provide for the use of a linear regression model to determine the amount of colinearity existing relative to the predicted path. The desired path may be represented as a line within a collinear type system and deviation from the system based upon the predicted path may warrant the generation of warning signals or driver intervention.

Chaos theory is a model that may be used to predict the possible movements of the vehicle in rollover risk incidents. There are so many different possible outcomes, given the dynamics of each rollover risk factor that only the probability of outcomes can be given with some amount of certainty. Going off the road or into a ditch or shoulder also introduces a radical new set of dynamics that could lead to a rollover. There is a predictive way to model possibilities and outcomes of catastrophic events from the database, and then to compare them to data received from the sensors. A knowledge base of these outcomes are loaded into the controller or database of driving conditions. As the vehicle continues to move, the database learns and thus the conditions are continuously modeled.

By utilizing an active comparison of where the vehicle is to where it should be (predicted path versus desired path), the interactive features of the system may provide the driver with a warning to tell the driver how fast the vehicle should be going and the best steering action while traveling. It is possible for the warning module to compare what the sensors are reading versus ideal sensor readouts for any given stretch of road. The warnings and interventions may then be tailored for the route, the topography, and the driver actions. Active warnings and intervention based on road conditions, collision imminence, pitch and roll readouts, speed, and over and under steering relative to the driver's current lane. The warnings and interventions may be initiated based on rate of change to a base position and then compared to the GPS location.

The system may also have a lag time and delay that would amount to a debouncing of signals and inputs prior to the initiation of driver warnings and intervention. The system may perform a constant comparison of an ideal trip versus the driver's interactions, along with speed, turning, lane drifting, collision avoidance, and upcoming road hazard feedback. The system in its comparison may use a predictive approach to driving, slowing down, curves ahead, object ahead warnings and allow timely intervention through driver actions.

A specific set of equations would be refined in a system according to road testing of the vehicle. Different vehicles having different driving characteristics based on vehicle size, tire size, suspension configuration, steering system configuration and other vehicle-to-vehicle variables. A general set of algorithms illustrating the idea is:

Confidence intervals for maneuvering, based on scaling the factors for driving risk may be set forth as:

$$\theta'_s = 1/(D/n)^{(1/2)} \Sigma_e a_e y_e \Rightarrow D = \Sigma a_e^2$$

The scaled effects $\theta'_s$ are the sum of the squares (D) of the number (n) of the number of data readings used in the calculations of the averages. If the sum of the scaled effects exceeds a rate of change for the "normal" value of the scaled effects versus the expected effect, a driver warning is issued.

Confidence intervals for n number of factors can be estimated using the general equation:

$$\theta'_s - t_{\alpha/2} s_e < \theta, \theta'_s + t_{\alpha/2} s_e$$

Colinearity exists when much of the data is a repeated set of points. High number variable colinearities will be approximately linear dependencies until a significant event alters the distribution of data points. Colinearity will exist if the vehicle is going uphill, downhill, or on a level plane as well as during a smooth curve travel. It will vary radically, however, during a road incident such as a tire blow out or hitting a pothole. A blowout will not allow the vehicle to recover to a colinear set of conditions. Hitting a pothole will see the vehicle rapidly recover to a normal set of curves. To see the relationship, a fixed ridge parameter (k) would be set by dividing least square estimates of the accelerometer data points into the accelerometer least means squared errors:

$$K = p s_e^2 / (\Sigma^p_{j=1} (b^s_i)^2)$$

Finally, using a standard linear regression model, speed (V), pitch (β), and yaw (ψ) could be colinearly related and warnings could be issued if an estimated error, e, were exceeded (where i=1, 2, 3, . . . n):

$$V_i = \beta_0 + \beta_1 \psi_j + e_i$$

Thus, if the comparison based upon the linear regression model warrants, a warning may be generated in step 132. The warning generated may be audible, visual, or a combination of the two. Also, as mentioned above with respect to FIG. 1, the audible and visual warnings may be external to the vehicle or internal to the vehicle. In step 134, should be the comparison predict a greater deviation from the predicted path such as beyond a threshold for generating warnings, driver intervention may be applied in step 134. As mentioned above, driver intervention may take the form of a driver intervention module 100 and various types of intervention due to the conditions may be provided. For example, the speed restriction, suspension center of gravity recovery, steering recovery, and gas tank load shifting may all be provided together, individually or in various combinations.

While particular embodiments of the invention have been shown and described, numerous variations and alternate embodiments will occur to those skilled in the art. Accordingly, it is intended that the invention be limited only in terms of the appended claims.

The invention claimed is:

1. A control system for a vehicle comprising:
a GPS system generating a vehicle position signal for a vehicle relative to a surface;
a plurality of driver inputs;
a plurality of vehicle sensors each providing a vehicle input; and
a controller coupled to the GPS system, the plurality of driver inputs and the plurality of vehicle inputs, said controller determining a predicted path in response to the plurality of driver inputs and the vehicle inputs, and determining a desired path in response to the GPS system, said controller performing a comparison of the predicted path and the desired path, said controller generating a control signal in response to the comparison,
wherein said controller performs the comparison using colinearity of a confidence level, or a linear regression model with said threshold corresponding to an estimated error.

2. A control system as recited in claim 1 further comprising a mad condition input, said controller generating the predicted path in response to the road condition input.

3. A control system as recited in claim 1 further comprising an intervention module, said intervention module operating in response to the control signal.

4. A control system as recited in claim 1 wherein the linear regression model is a function of pitch angle, yaw angle and vehicle speed.

5. A control system as recited in claim 1 wherein the plurality of vehicle inputs includes a vehicle speed.

6. A control system as recited in claim 1 wherein the pitch angle and yaw angle are determined in the GPS receiver.

7. A control system as recited in claim 1 further comprising an audible indicator, said audible indicator operating in response to the control signal.

8. A control system as recited in claim 1 further comprising a visual indicator, said visual indicator operating in response to the control signal.

9. A control system as recited in claim 3 wherein the intervention module generates a gas tank load shift.

10. A control system as recited in claim 3 wherein the intervention module generates a vehicle speed restriction.

11. A control system as recited in claim 3 wherein the intervention module generates a change in a center of gravity by controlling a suspension component.

12. A control system as recited in claim 3 wherein the intervention module generates a change in a center of gravity by controlling a shock absorber.

13. A control system as recited in claim 3 wherein the intervention module generates a steering angle change.

14. A control system for a vehicle comprising:
   a driving condition database having driving conditions therein;
   a GPS system generating a vehicle position signal for a vehicle relative to a surface;
   a plurality of driver inputs;
   a plurality of vehicle sensors each providing a vehicle input; and
   a controller coupled to the GPS system, the plurality of driver inputs and the plurality of vehicle inputs, said controller determining a predicted condition in response to the plurality of driver inputs, the vehicle inputs and the driving conditions, and determining a desired condition in response to the GPS system and the driving conditions, said controller performing a chaos-theory based comparison of the predicted path and the desired path, said controller generating controlling an intervention module or an indicator in response to the comparison,
   wherein said controller performs the chaos theory based comparison using colinarity of a confidence level, or a linear regression model with said threshold corresponding to an estimated error.

15. A control system as recited in claim 14 wherein the predicted condition comprises a predicted path and the desired condition comprise a desired path.

16. A control system as recited in claim 14 wherein the linear regression model is a function of pitch angle, yaw angle and vehicle speed.

* * * * *